(12) United States Patent
Singh

(10) Patent No.: US 12,245,263 B2
(45) Date of Patent: Mar. 4, 2025

(54) SEMI-PERSISTENT SCHEDULING FOR MULTIPLE SERVICES

(71) Applicant: Telefonaktiebolaget LM Ericsson (publ), Stockholm (SE)

(72) Inventor: Bikramjit Singh, Kirkkonummi (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 405 days.

(21) Appl. No.: 17/770,787

(22) PCT Filed: Oct. 20, 2020

(86) PCT No.: PCT/SE2020/051006
§ 371 (c)(1),
(2) Date: Apr. 21, 2022

(87) PCT Pub. No.: WO2021/080486
PCT Pub. Date: Apr. 29, 2021

(65) Prior Publication Data
US 2022/0417951 A1    Dec. 29, 2022

Related U.S. Application Data

(60) Provisional application No. 62/924,296, filed on Oct. 22, 2019.

(51) Int. Cl.
*H04W 72/542* (2023.01)
*H04W 72/23* (2023.01)

(52) U.S. Cl.
CPC ......... *H04W 72/542* (2023.01); *H04W 72/23* (2023.01)

(58) Field of Classification Search
None
See application file for complete search history.

(56) References Cited

U.S. PATENT DOCUMENTS

| 2018/0249486 A1 | 8/2018 | Hosseini et al. |
| 2018/0249846 A1 | 8/2018 | Hosseini et al. |

(Continued)

FOREIGN PATENT DOCUMENTS

| WO | 2017184850 A1 | 10/2017 |
| WO | 2018129325 A1 | 7/2018 |
| WO | WO-2020030279 A1 * | 2/2020 |
| WO | WO-2021025693 A1 * | 2/2021 |

OTHER PUBLICATIONS

International Search Report and Written Opinion dated Mar. 2, 2021 for International Application No. PCT/SE2020/051006 filed Oct. 20, 2020, consisting of 16 pages.

(Continued)

*Primary Examiner* — Saumit Shah
(74) *Attorney, Agent, or Firm* — Weisberg I.P. Law, P.A.

(57) ABSTRACT

A method, system and apparatus are disclosed for more fully utilizing a periodic or semi-static scheduled resource, including the repetition resource. In accordance with various embodiments, a network node is configured to allocate a periodic or semi-static scheduled resource to a wireless device (WD) for use in communication for at least two services having different reliability or transmission characteristics. The periodic or semi-static scheduled resource may be allocated by estimating a packet arrival from each of the WD services or in proportion to a services' priority. A periodicity of the resource may be set to a periodicity of an ultra-reliable and low latency communication (URLLC) packet arrival periodicity of a URLLC stream. A repetitious configured grant (CG) can be utilized for additional services or throughput gain. The spared periodic or semi-static scheduled resource may also be allocated for a retransmission of failed packets from a service.

18 Claims, 13 Drawing Sheets

(56) References Cited

U.S. PATENT DOCUMENTS

| | | | |
|---|---|---|---|
| 2019/0349960 A1* | 11/2019 | Li | H04L 5/0055 |
| 2021/0258049 A1* | 8/2021 | Esswie | H04W 72/1263 |
| 2022/0150000 A1* | 5/2022 | Liu | H04L 1/1864 |
| 2022/0264623 A1* | 8/2022 | Yin | H04W 72/56 |
| 2022/0360403 A1* | 11/2022 | Salim | H04L 5/0078 |
| 2023/0300849 A1* | 9/2023 | Park | H04L 5/00 |
| | | | 370/329 |

OTHER PUBLICATIONS

3GPP TSG RAN WG1 Meeting #97 R1-1906098; Title: Intra-UE Prioritization and Multiplexing of DL Transmissions; Agenda Item: 7.2.6.7; Source: Ericsson; Document for: Discussion, Decision; Location and Date: Reno, Nevada, USA, May 13-17, 2019, consisting of 3 pages.

3GPP TSG RAN WG1 #96 R1-1901697; Title: Enhanced UL grant-free transmission for URLLC; Source: vivo; Agenda Item: 7.2.6.3; Document for: Discussion and Decision; Location and Date: Athens, Greece, Feb. 25-Mar. 1, 2019, consisting of 7 pages.

3GPP TSG RAN WG1#98 R1-1908436; Title: On PDCCH Enhancements for NR URLLC; Agenda item: 7.2.6.1; Source: Nokia, Nokia Shanghai Bell; Document for: Discussion and Decision; Location and Date: Prague, Czech, Aug. 26-30, 2019, consisting of 21 pages.

3GPP TS 38.214 V16.3.0 3rd Generation Partnership Project; Technical Specification Group Radio Access Network; NR; Physical layer procedures for data (Release 16); Sep. 2020, consisting of 166 pages.

\* cited by examiner

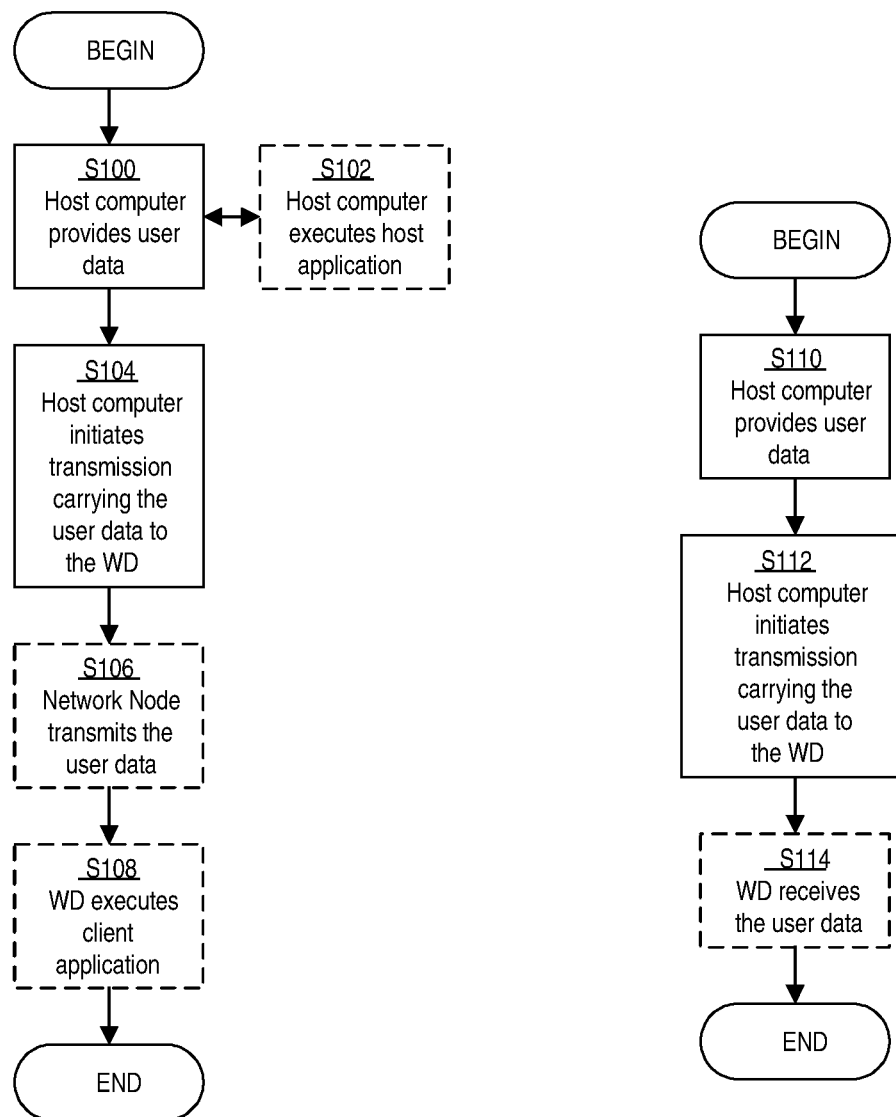

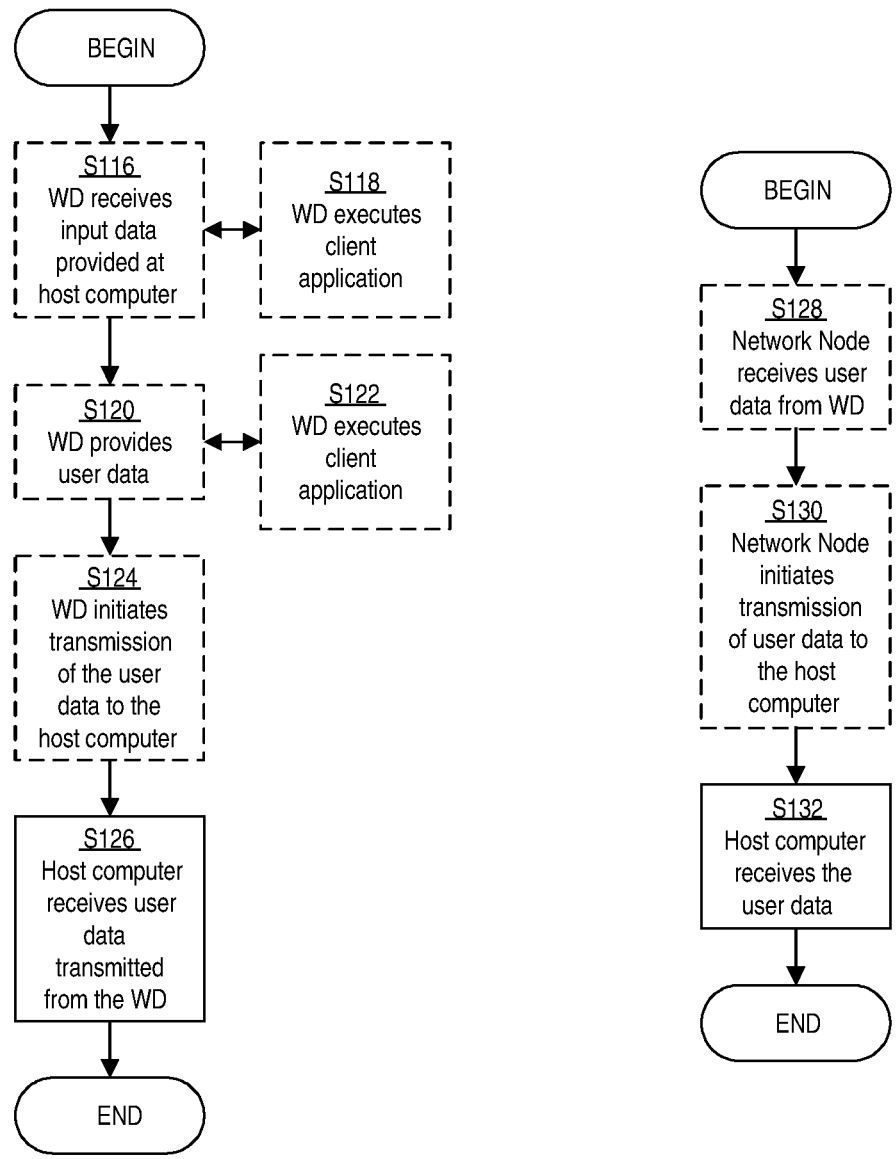

Splitting SPS repetition resources proportional to a services priority of multiple WDs. Accordingly, the network node transmits a single configured grant for multiple WDs.

SEMI-PERSISTENT SCHEDULING FOR MULTIPLE SERVICES

TECHNICAL FIELD

Wireless communication and in particular, to methods and devices for utilizing a semi-persistent scheduling resource, including a repetition resource.

BACKGROUND

The New radio (NR) (also known as "5G") standard in the Third Generation Partnership Project (3GPP) is designed to provide service for multiple use cases such as enhanced mobile broadband (eMBB), ultra-reliable and low latency communication (URLLC), and machine type communication (MTC). Each of these services may have different technical requirements. For example, the general requirement for eMBB is a high data rate with moderate latency and moderate coverage, while URLLC service requires a low latency and high reliability transmission but may require more moderate data rates.

A configured grant (CG) is a used to support URLLC traffic. The characteristics of URLLC traffic make a dynamic grant unsuitable for several reasons. URLLC traffic is often based on periodic and predictable traffic patterns, for example when transmitting sensor measurements and/or actuator commands for factory automation or remote driving. In such a case, configured grants may be used instead of dynamic grants to decrease physical downlink control channel (PDCCH) usage, thus improving resource usage efficiency and reliability. For non-periodic traffic, the stringent latency bounds often make scheduling request (SR) based transmissions inefficient or impossible to use.

Multiple Configurations

A potential realization of a CG is to enable multiple configurations for a wireless device (WD) within a single serving cell/Bandwidth Part (BWP). This enables the WD to have multiple pre-configured transmission occasions with different settings, e.g. periodicity, time offset, frequency resources, Modulation Coding Scheme (MCS) indices, etc. Also, the time duration, and frequency resource allocation can be different. Additionally, these parameters, such as periodicity, MCS indices, and repetitions, may be different to fit the requirement of an industrial (e.g., Time Sensitive Networking (TSN)) stream. Therefore, with such multiple configurations, the network can satisfy the Quality of Service (QoS) requirements, that can be translated into a radio access network (RAN) parameter, i.e., periodicity, time duration, frequency resources, MCS index, and repetition, for all industrial streams per TSN node and/or WD.

The multiple configurations may be used for at least two notable purposes namely:

1. Transmitting different data (service) streams; and
2. Deterring misalignment errors.

With regard to deterring misalignment errors, consider the example presented in FIG. 1. FIG. 1 is an illustration of an example of counter misalignment when using multiple Semi-Persistent Scheduling (SPSs) where a WD is allocated 3 CGs (uplink (UL) SPSs, with each CG containing 4 Transmission Occasions (TOs). The WD utilizes these 4 CGs to counter fluctuations in arrival times because of its low latency budget. As shown in FIG. 1, due to different arrivals in time, a WD may use the nearest CG to transmits its 4 repetitions.

Usually SPS carries a particular traffic stream, e.g., if a WD is receiving deterministic or semi-deterministic URLLC traffic with a given QoS (reliability), an SPS allocation may be granted. With a plurality of services for a single WD, e.g., best-effort or real-time services with a range of reliability/latency constraints, a single SPS allocation just for a single service reflects an inefficient and inflexible resource allocation behavior.

SUMMARY

Some embodiments advantageously provide a method and system for allocating a periodic or semi-static scheduled resource to a WD for use in communication for at least two services having different reliability and/or transmission characteristics. By using one of these embodiments, network can efficiently utilize periodic or semi-static scheduled resources and save resources as compared with other solutions.

According to one aspect of the disclosure, a network node is configured to communicate with a wireless device, WD. The network node is configured to allocate a periodic or semi-static scheduled resource to the WD for use in communication for at least two services, the services having one of at least different reliability and different transmission characteristics.

According to one or more embodiments of this aspect, the periodic or semi-static scheduled resource is at least one semi-persistent scheduling, SPS, resource for use in downlink, DL, communication for the at least two services. According to one or more embodiments of this aspect, the periodic or semi-static scheduled resource is at least one configured grant, CG, resource for use in uplink, UL, communication for the at least two services. According to one or more embodiments of this aspect, the periodic or semi-static scheduled resource is allocated at least by estimating a packet arrival from each of the at least two services. According to one or more embodiments of this aspect, the network node is further configured to set a periodicity of the periodic or semi-static scheduled resource to a periodicity of an ultra-reliable and low latency communication, URLLC, packet arrival periodicity of a URLLC stream. According to one or more embodiments of this aspect, the network node is further configured to set a periodicity of the periodic or semi-static scheduled resource to a periodicity greater than a URLLC packet arrival periodicity. According to one or more embodiments of this aspect, the network node is further configured to utilize a periodic or semi-static scheduled resource with repetitions by transmitting a data packet separated across multiple Transport Blocks, TBs, over the periodic or semi-static scheduled resource with repetitions. According to one or more embodiments of this aspect, the network node is further configured to utilize the periodic or semi-static scheduled resource with repetitions in proportion to at least one of a priority and a reliability of a service. According to one or more embodiments of this aspect, the network node is further configured to send the WD an indication that the periodic or semi-static scheduled resource with repetitions contains non-repetitive data. According to one or more embodiments of this aspect, the network node is further configured to allocate the periodic or semi-static scheduled resource for a retransmission of failed packets for at least one service. According to one or more embodiments of this aspect, the network node is further configured to configure the WD to use a configured grant, CG, to transmit at least one transmission block, TB, of a service. According to one or more embodiments of this aspect, the network node is further configured to configure the WD to use a single configured grant, CG, configured for a first WD to transmit a transmission block, TB, to a second WD. According to one or more embodiments of this aspect, the network node is further configured to reallocate the periodic or semi-static scheduled resource to at least one new service.

According to another aspect of the disclosure, a method is implemented in a network node. The method comprises allocating a periodic or semi-static scheduled resource to the WD for use in communication for at least two services, the services having one of at least different reliability and different transmission characteristics.

According to one or more embodiments of this aspect, the periodic or semi-static scheduled resource is at least one semi-persistent scheduling, SPS, resource for use in downlink, DL, communication for the at least two services. According to one or more embodiments of this aspect, the periodic or semi-static scheduled resource is at least one configured grant, CG, resource for use in uplink, UL, communication for the at least two services. According to one or more embodiments of this aspect, the periodic or semi-static scheduled resource is allocated at least by estimating a packet arrival from each of the at least two services. According to one or more embodiments of this aspect, the method further comprises setting a periodicity of the periodic or semi-static scheduled resource to a periodicity of an ultra-reliable and low latency communication, URLLC, packet arrival periodicity of a URLLC stream. According to one or more embodiments of this aspect, the method further comprises setting a periodicity of the periodic or semi-static scheduled resource to a periodicity greater than a URLLC packet arrival periodicity. According to one or more embodiments of this aspect, the method further comprises utilizing a periodic or semi-static scheduled resource with repetitions by transmitting a single data packet separated across multiple Transport Blocks, TBs, over the periodic or semi-static scheduled resource with repetitions. According to one or more embodiments of this aspect, the method further comprises utilizing the periodic or semi-static scheduled resource with repetitions in proportion to at least one of a priority and a reliability of a service. According to one or more embodiments of this aspect, the method further comprises sending the WD an indication that the periodic or semi-static scheduled resource with repetitions contains non-repetitive data. According to one or more embodiments of this aspect, the method further comprises allocating the periodic or semi-static scheduled resource for a retransmission of failed packets for at least one service. According to one or more embodiments of this aspect, the method further comprises configuring the WD to use a configured grant, CG, to transmit at least one transmission block, TB, of a service. According to one or more embodiments of this aspect, the method further comprises configuring the WD use a single CG configured for a first WD to transmit a transmission block, TB, to a second WD. According to one or more embodiments of this aspect, the method further comprises reallocating the periodic or semi-static scheduled resource to at least one new service.

According to another aspect of the disclosure, a wireless device (WD) is configured to communicate with a network node. The WD is configured to receive data from the network node for at least two services in a periodic or semi-static scheduled resource allocated to the WD, the services having one of at least different reliability and different transmission characteristics.

According to one or more embodiments of this aspect, the periodic or semi-static scheduled resource is at least one semi-persistent scheduling, SPS, resource for use in downlink, DL, communication for the at least two services. According to one or more embodiments of this aspect, the periodic or semi-static scheduled resource is at least one configured grant, CG, resource for use in uplink, UL, communication for the at least two services. According to one or more embodiments of this aspect, the periodic or semi-static scheduled resource is allocated at least by estimating a packet arrival from each of the at least two services. According to one or more embodiments of this aspect, the WD is further configured to set a periodicity of the periodic or semi-static scheduled resource to a periodicity of an ultra-reliable and low latency communication, URLLC, packet arrival periodicity of a URLLC stream. According to one or more embodiments of this aspect, the WD is further configured to set a periodicity of the periodic scheduled resource to a periodicity greater than a URLLC packet arrival periodicity. According to one or more embodiments of this aspect, the WD is further configured to utilize a periodic or semi-static scheduled resource with repetitions to receive a single data packet from the network node separated across multiple Transport Blocks, TBs, over the periodic or semi-static scheduled resource with repetitions. According to one or more embodiments of this aspect, the WD is further configured to utilize the periodic or semi-static scheduled resource with repetitions in proportion to at least one of a priority and a reliability of a service. According to one or more embodiments of this aspect, the WD is further configured to receive from the network node an indication that the periodic or semi-static scheduled resource with repetitions contains non-repetitive data. According to one or more embodiments of this aspect, the WD is further configured to allocate the periodic or semi-static scheduled resource for a retransmission of failed packets for at least one service. According to one or more embodiments of this aspect, the WD is further configured to use a configured grant, CG, to transmit at least one transmission block, TB, of a service. According to one or more embodiments of this aspect, the WD is further configured to use a single CG configured for a second WD to receive a transmission block, TB, from the network node. According to one or more embodiments of this aspect, the WD is further configured to reallocate the periodic or semi-static scheduled resource to at least one new service.

According to another aspect of the disclosure, a method is implemented in a wireless device (WD). The method comprises receiving data from a network node for at least two services in a periodic or semi-static scheduled resource allocated to the WD, the services having one of at least different reliability and different transmission characteristics.

According to one or more embodiments of this aspect, the periodic or semi-static scheduled resource is at least one semi-persistent scheduling, SPS, resource for use in downlink, DL, communication for the at least two services. According to one or more embodiments of this aspect, the periodic or semi-static scheduled resource is at least one configured grant, CG, resource for use in uplink, UL, communication for the at least two services. According to one or more embodiments of this aspect, the periodic or semi-static scheduled resource is allocated at least by estimating a packet arrival from each of the at least two services. According to one or more embodiments of this aspect, the method further comprises setting a periodicity of the periodic or semi-static scheduled resource to a periodicity of an ultra-reliable and low latency communication, URLLC, packet arrival periodicity of a URLLC stream. According to one or more embodiments of this aspect, the method further comprises setting a periodicity of the periodic or semi-static scheduled resource to a periodicity greater than a URLLC packet arrival periodicity. According to one or more embodiments of this aspect, the method further comprises utilizing a periodic or semi-static scheduled resource with repetitions to receive a single data packet from the network node separated across multiple Transport Blocks, TBs, over the periodic or semi-static scheduled resource with repetitions. According to one or more embodiments of this aspect, the method further comprises utilizing the periodic or semi-static scheduled resource with repetitions in proportion to at least one of a priority and a reliability of a service. According to one or more embodiments of this aspect, the method further comprises receiving from the network node an indication that the periodic or semi-static scheduled resource with repetitions contains non-repetitive data. According to one or more embodiments of this aspect, the method further comprises allocating the periodic or semi-static scheduled resource for a retransmission of failed packets for at least one service. According to one or more embodiments of this aspect, the method further comprises using a configured grant, CG, to transmit at least one transmission block, TB, of a service. According to one or more embodiments of this aspect, the method further comprises using a single CG configured for a second WD to receive a transmission block, TB, from the network node. According to one or more embodiments of this aspect, the method further comprises reallocating the periodic or semi-static scheduled resource to at least one new service.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart illustrating exemplary methods implemented in a communication system including a host computer, a network node and a wireless device for executing a client application at a wireless device according to some embodiments of the present disclosure;

FIG. 5 is a flowchart illustrating exemplary methods implemented in a communication system including a host computer, a network node and a wireless device for receiving user data at a wireless device according to some embodiments of the present disclosure;

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
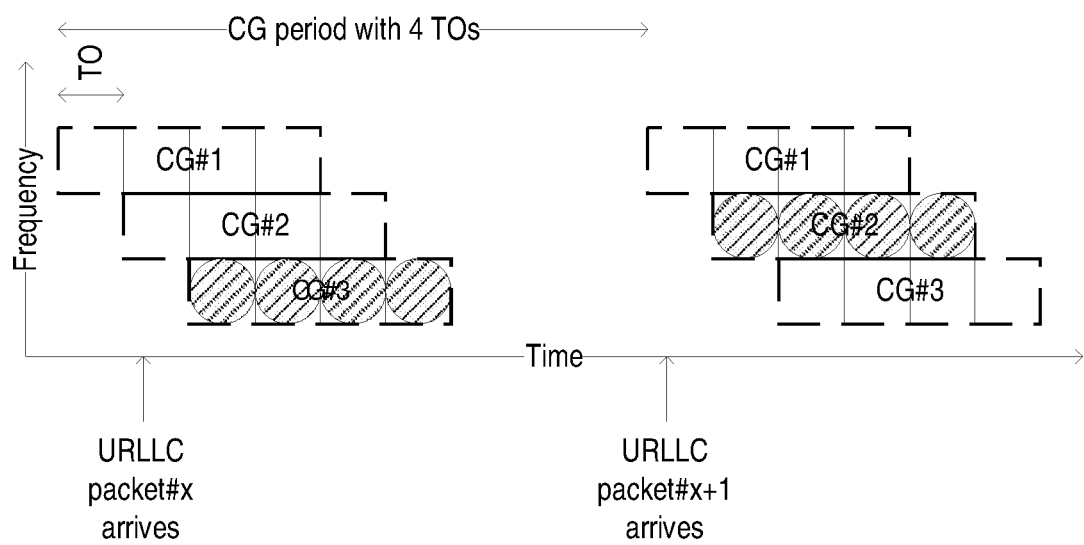
FIG. 1 is an illustration of an example of counter misalignment when using multiple semi-persistent scheduling.

Before describing in detail exemplary embodiments, it is noted that the embodiments reside primarily in combinations of apparatus components and processing steps related to allocating a periodic or semi-static scheduled resource to a WD for use in communication for at least two services having different reliability and/or transmission characteristics. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
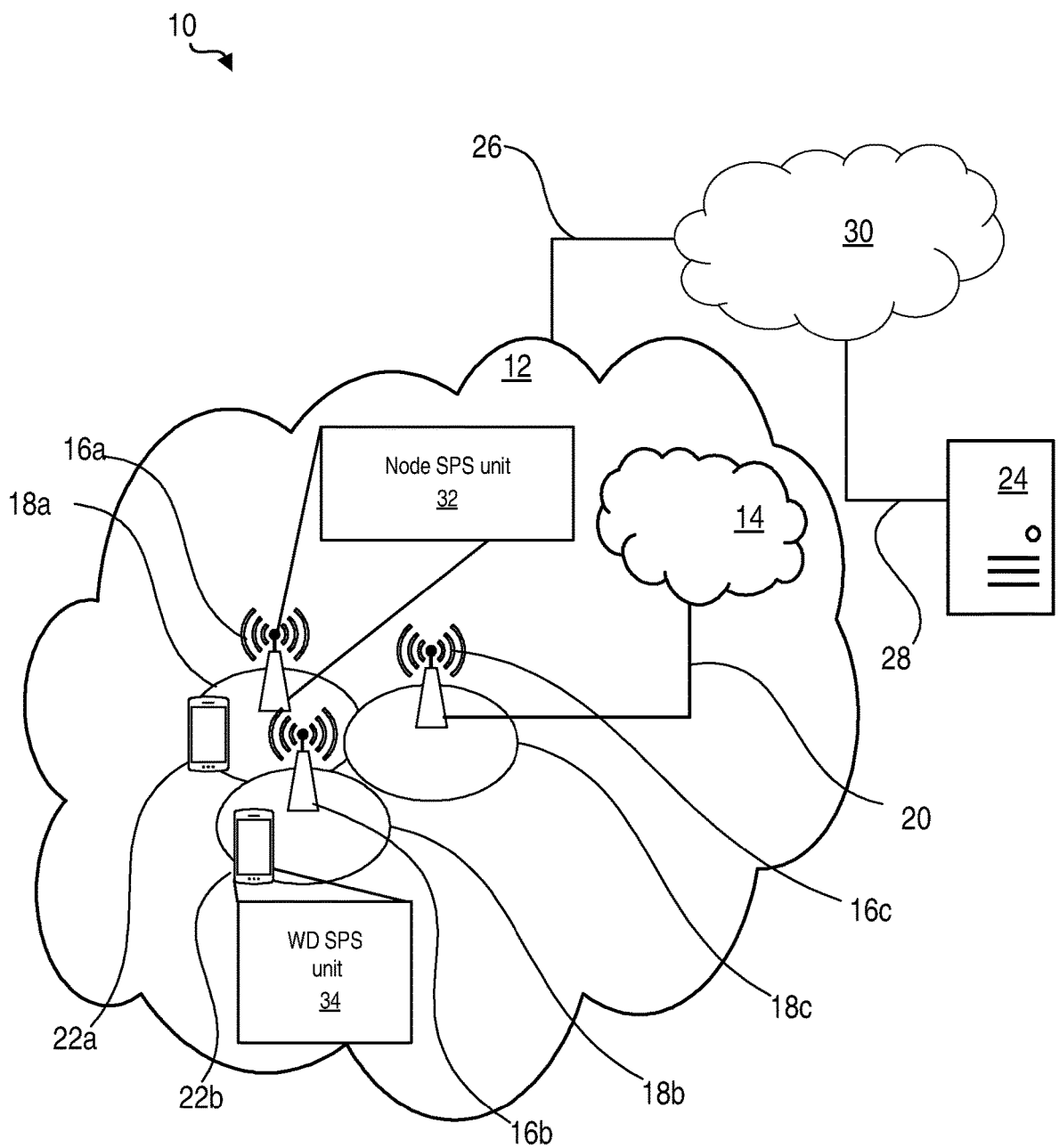
FIG. 2 is a schematic diagram of an exemplary network architecture illustrating a communication system connected via an intermediate network to a host computer according to the principles in the present disclosure.

Embodiments provide systems and methods for more fully utilizing an SPS resource, including the repetition resource. Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. In some embodiments described herein, WD 22 may be a second network node 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a node SPS resource unit 32 which is configured to allocate a periodic or semi-static scheduled resource to the WD 22 for use in communication for at least two services, the services having one of at least different reliability and different transmission characteristics. A wireless device 22 is configured to include a WD SPS unit 34 which is configured to receive data from the network node 16 for at least two services in a periodic or semi-static scheduled resource allocated to the WD 22, the services having one of at least different reliability and different transmission characteristics. SPS may be used herein to interchangeably mean a periodically scheduled resource or semi-persistent scheduled resource. Thus, in various embodiments, the node SPS unit 32 and WD SPS unit 34 may be configured to support SPS in the form of periodic or semi-static scheduling.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor and/or control the network node 16 and/or the wireless device 22. The processing circuitry 42 of the host computer 24 may include a monitoring unit 54 configured to enable the service provider to observe, monitor and/or control the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node SPS unit 32 configured to allocate a periodic or semi-static scheduled resource to the WD 22 for use in communication for at least two services, the services having one of at least different reliability and different transmission characteristics.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD SPS unit 34 configured to receive data from the network node 16 for at least two services in a periodic or semi-static scheduled resource allocated to the WD 22, the services having one of at least different reliability and different transmission characteristics.

Figure 3:
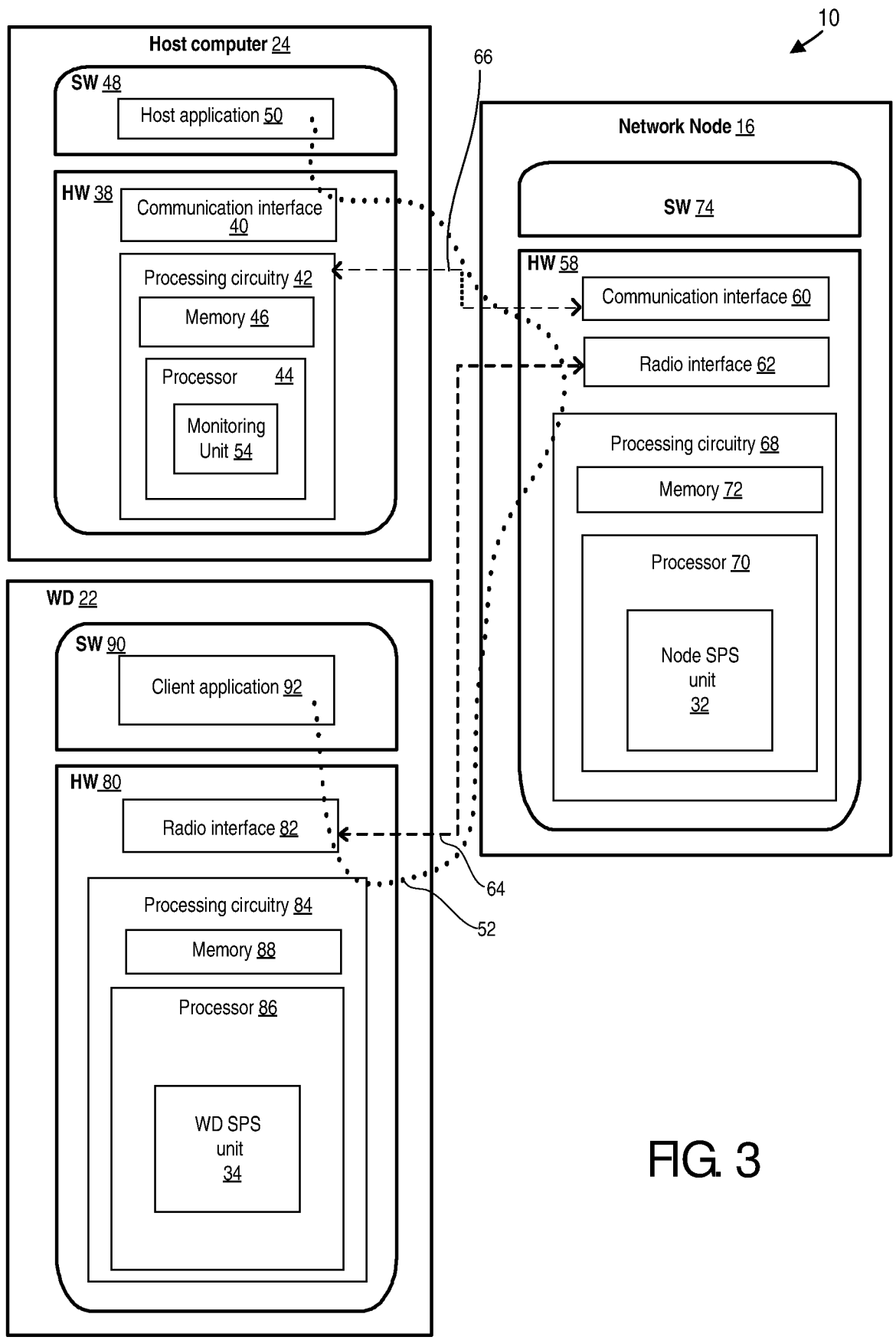
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as node SPS unit 32, and WD SPS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
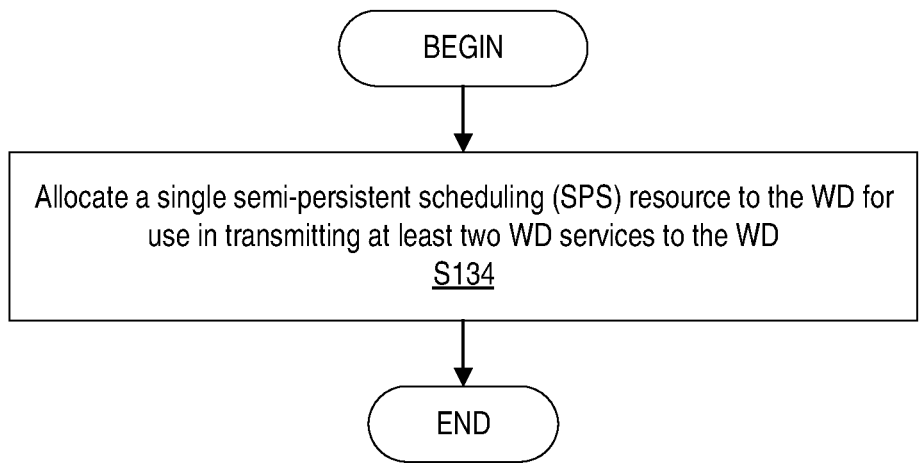
FIG. 8 is a flowchart of an exemplary process in a network node for utilizing an SPS resource for multiple services according to some embodiments of the present disclosure.

FIG. 8 is a flowchart of an exemplary process in a network node 16 for utilizing an SPS resource, including the repetition resource, for multiple services. One or more Blocks and/or functions performed by network node 16 may be performed by one or more elements of network node 16 such as by node SPS unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to allocate (Block S134) a single SPS resource to the WD 22 for use in transmitting at least two services to the WD 22.

In one or more embodiments, the single SPS resource is allocated at least by estimating a packet arrival from each of the at least two services. In one or more embodiments, network node 16 such as via one or more of processing circuitry 68, processor 70, radio interface 62 and communication interface 60 is configured to set a periodicity of the single SPS resource to a periodicity of an ultra-reliable and low latency communication (URLLC) packet arrival periodicity of a URLLC stream. In one or more embodiments, network node 16 such as via one or more of processing circuitry 68, processor 70, radio interface 62 and communication interface 60 is configured to set a periodicity of the single SPS resource to a periodicity greater than a URLLC packet arrival periodicity. In one or more embodiments, network node 16 such as via one or more of processing circuitry 68, processor 70, radio interface 62 and communication interface 60 is configured to utilize a SPS repetition resource by transmitting a single data packet in multiple Transport Blocks (TBs) over the SPS repetition resource.

In one or more embodiments, network node 16 such as via one or more of processing circuitry 68, processor 70, radio interface 62 and communication interface 60 is configured to utilize the SPS repetition resource to transmit multiple services. In one or more embodiments, network node 16 such as via one or more of processing circuitry 68, processor 70, radio interface 62 and communication interface 60 is configured to utilize the SPS repetition resource in proportion to a services' priority. In one or more embodiments, network node 16 such as via one or more of processing circuitry 68, processor 70, radio interface 62 and communication interface 60 is configured to send the WD an indication that the SPS repetition resource contains non-repetitive data. In one or more embodiments, network node 16 such as via one or more of processing circuitry 68, processor 70, radio interface 62 and communication interface 60 is configured to allocate the SPS resource for a retransmission of failed packets from at least one service. In one or more embodiments, network node 16 such as via one or more of processing circuitry 68, processor 70, radio interface 62 and communication interface 60 is configured to use a configured grant (CG) to transmit at least one TB of a service.

In one or more embodiments, network node 16 such as via one or more of processing circuitry 68, processor 70, radio interface 62 and communication interface 60 is configured to use a CG configured for a first WD 22 to transmit a TB to a second WD 22. In one or more embodiments, network node 16 such as via one or more of processing circuitry 68, processor 70, radio interface 62 and communication interface 60 is configured to reallocate the SPS resource to at least one new service.

Figure 9:
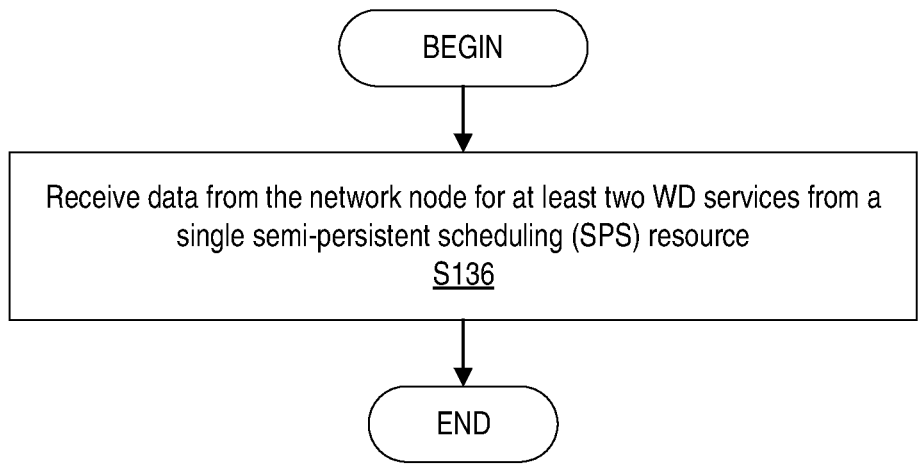
FIG. 9 is a flowchart of an exemplary process in a wireless device for utilizing an SPS resource for multiple services according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by WD SPS unit 34 in processing circuitry 84, processor 86, radio interface 82, etc. In one or more embodiments, wireless device 22 such as via one or more of processing circuitry 84, processor 86 and radio interface 82 is configured to receive (Block S136) data from the network node for at least two services from a single semi-persistent scheduling (SPS) resource.

In one or more embodiments, the single SPS resource is allocated at least by estimating a packet arrival from each of the at least two services. In one or more embodiments, wireless device 22 such as via one or more of processing circuitry 84, processor 86 and radio interface 82 is configured to set a periodicity of the single SPS resource to a periodicity of an ultra-reliable and low latency communication (URLLC) packet arrival periodicity of a URLLC stream. In one or more embodiments, wireless device 22 such as via one or more of processing circuitry 84, processor 86 and radio interface 82 is configured to set a periodicity of the single SPS resource to a periodicity greater than a URLLC packet arrival periodicity.

In one or more embodiments, wireless device 22 such as via one or more of processing circuitry 84, processor 86 and radio interface 82 is configured to utilize a SPS repetition resource to receive a single data packet from the network node in multiple Transport Blocks (TBs) over the SPS repetition resource. In one or more embodiments, wireless device 22 such as via one or more of processing circuitry 84, processor 86 and radio interface 82 is configured to utilize the SPS repetition resource for multiple services. In one or more embodiments, wireless device 22 such as via one or more of processing circuitry 84, processor 86 and radio interface 82 is configured to utilize the SPS repetition resource in proportion to a services' priority.

In one or more embodiments, wireless device 22 such as via one or more of processing circuitry 84, processor 86 and radio interface 82 is configured to receive from the network node an indication that the SPS repetition resource contains non-repetitive data. In one or more embodiments, wireless device 22 such as via one or more of processing circuitry 84, processor 86 and radio interface 82 is configured to allocate the SPS resource for a retransmission of failed packets from at least one service.

In one or more embodiments, wireless device 22 such as via one or more of processing circuitry 84, processor 86 and radio interface 82 is configured to use a configured grant (CG) to transmit at least one TB of a service.

In one or more embodiments, wireless device 22 such as via one or more of processing circuitry 84, processor 86 and radio interface 82 is configured to use a CG configured for a second WD 22 to receive a TB from the network node. In one or more embodiments, wireless device 22 such as via one or more of processing circuitry 84, processor 86 and radio interface 82 is configured to reallocate the SPS resource to at least one new service.

Figure 10:
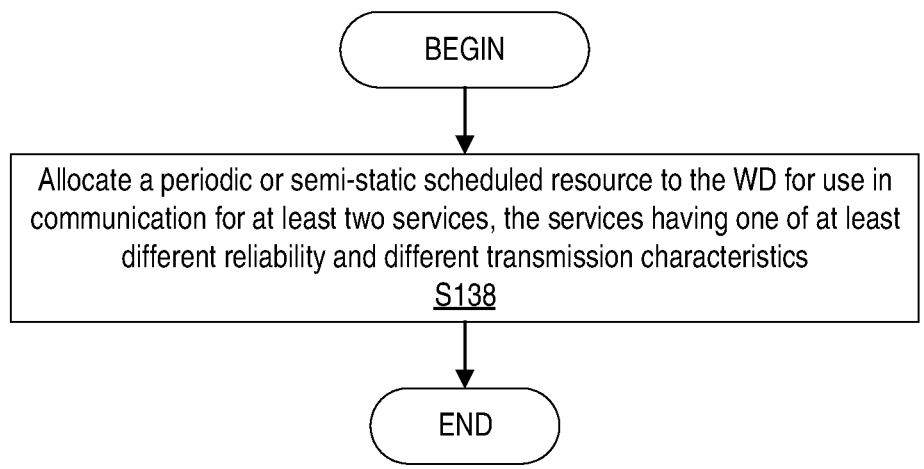
FIG. 10 is a flowchart of an exemplary process in a network node for allocating a periodic or semi-static scheduled resource to a WD for use in communication for at least two services according to some embodiments of the present disclosure.

FIG. 10 is a flowchart of an exemplary process in a network node 16 for allocating a periodic or semi-static scheduled resource to the WD 22 for use in communication for at least two services. One or more Blocks and/or functions performed by network node 16 may be performed by one or more elements of network node 16 such as by node SPS unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to allocate (Block S138) a periodic or semi-static scheduled resource to the WD 22 for use in communication for at least two services, the services having one of at least different reliability and different transmission characteristics.

In one or more embodiments, the periodic or semi-static scheduled resource is at least one semi-persistent scheduling, SPS, resource for use in downlink, DL, communication for the at least two services. In one or more embodiments, the periodic or semi-static scheduled resource is at least one configured grant, CG, resource for use in uplink, UL, communication for the at least two services. In one or more embodiments, the periodic or semi-static scheduled resource is allocated at least by estimating a packet arrival from each of the at least two services.

In one or more embodiments, network node 16 such as via one or more of processing circuitry 68, processor 70, radio interface 62 and communication interface 60 is configured to set a periodicity of the periodic or semi-static scheduled resource to a periodicity of an ultra-reliable and low latency communication, URLLC, packet arrival periodicity of a URLLC stream. In one or more embodiments, network node 16 such as via one or more of processing circuitry 68, processor 70, radio interface 62 and communication interface 60 is configured to set a periodicity of the periodic or semi-static scheduled resource to a periodicity greater than a URLLC packet arrival periodicity. In one or more embodiments, network node 16 such as via one or more of processing circuitry 68, processor 70, radio interface 62 and communication interface 60 is configured to utilize a periodic or semi-static scheduled resource with repetitions by transmitting a data packet separated across multiple Transport Blocks, TBs, over the periodic or semi-static scheduled resource with repetitions. In one or more embodiments, network node 16 such as via one or more of processing circuitry 68, processor 70, radio interface 62 and communication interface 60 is configured to utilize the periodic or semi-static scheduled resource with repetitions in proportion to at least one of a priority and a reliability of a service. In one or more embodiments, network node 16 such as via one or more of processing circuitry 68, processor 70, radio interface 62 and communication interface 60 is configured to send the WD 22 an indication that the periodic or semi-static scheduled resource with repetitions contains non-repetitive data. In one or more embodiments, network node 16 such as via one or more of processing circuitry 68, processor 70, radio interface 62 and communication interface 60 is configured to allocate the periodic or semi-static scheduled resource for a retransmission of failed packets for at least one service. In one or more embodiments, network node 16 such as via one or more of processing circuitry 68, processor 70, radio interface 62 and communication interface 60 is configured to configure the WD 22 to use a configured grant, CG, to transmit at least one transmission block, TB, of a service. In one or more embodiments, network node 16 such as via one or more of processing circuitry 68, processor 70, radio interface 62 and communication interface 60 is configured to configure the WD 22 to use a single configured grant, CG, configured for a first WD 22 to transmit a transmission block, TB, to a second WD 22. In one or more embodiments, network node 16 such as via one or more of processing circuitry 68, processor 70, radio interface 62 and communication interface 60 is configured to reallocate the periodic or semi-static scheduled resource to at least one new service.

Figure 11:
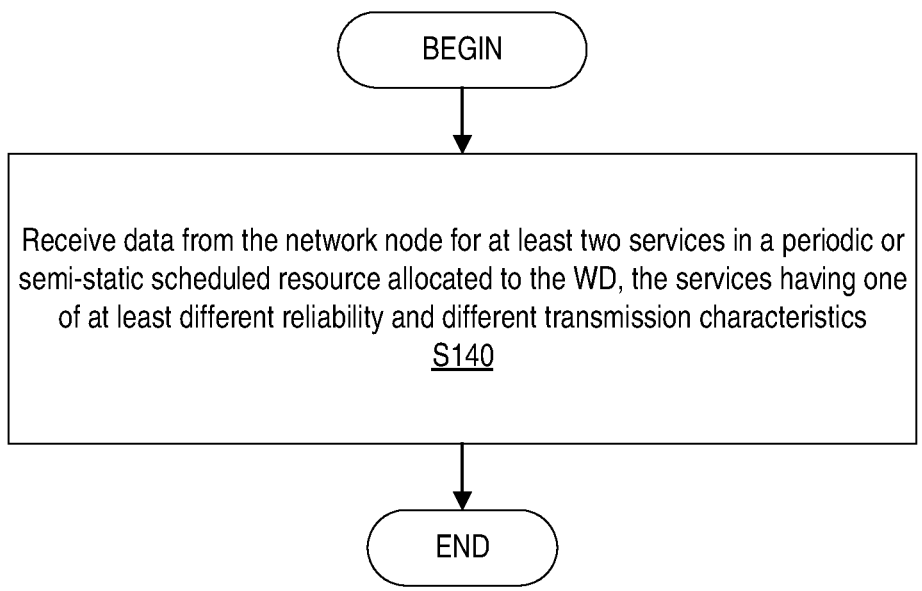
FIG. 11 is a flowchart of an exemplary process in a wireless device according to some embodiments of the present disclosure.

FIG. 11 is a flowchart of an exemplary process in a wireless device 22 according to some embodiments of the present disclosure. One or more Blocks and/or functions performed by wireless device 22 may be performed by one or more elements of wireless device 22 such as by WD SPS unit 34 in processing circuitry 84, processor 86, radio interface 82, etc. In one or more embodiments, wireless device 22 such as via one or more of processing circuitry 84, processor 86 and radio interface 82 is configured to receive (Block S140) data from the network node 16 for at least two services in a periodic or semi-static scheduled resource allocated to the WD 22, the services having one of at least different reliability and different transmission characteristics.

In one or more embodiments, the periodic or semi-static scheduled resource is at least one semi-persistent scheduling, SPS, resource for use in downlink, DL, communication for the at least two services. In one or more embodiments, the periodic or semi-static scheduled resource is at least one configured grant, CG, resource for use in uplink, UL, communication for the at least two services. In one or more embodiments, the periodic or semi-static scheduled resource is allocated at least by estimating a packet arrival from each of the at least two services.

In one or more embodiments, WD 22 such as via one or more of processing circuitry 84, processor 86 and radio interface 82 is configured to set a periodicity of the periodic or semi-static scheduled resource to a periodicity of an ultra-reliable and low latency communication, URLLC, packet arrival periodicity of a URLLC stream. In one or more embodiments, WD 22 such as via one or more of processing circuitry 84, processor 86 and radio interface 82 is configured to set a periodicity of the periodic scheduled resource to a periodicity greater than a URLLC packet arrival periodicity. In one or more embodiments, WD 22 such as via one or more of processing circuitry 84, processor 86 and radio interface 82 is configured to utilize a periodic or semi-static scheduled resource with repetitions to receive a single data packet from the network node 16 separated across multiple Transport Blocks, TBs, over the periodic or semi-static scheduled resource with repetitions. In one or more embodiments, WD 22 such as via one or more of processing circuitry 84, processor 86 and radio interface 82 is configured to utilize the periodic or semi-static scheduled resource with repetitions in proportion to at least one of a priority and a reliability of a service. In one or more embodiments, WD 22 such as via one or more of processing circuitry 84, processor 86 and radio interface 82 is configured to receive from the network node 16 an indication that the periodic or semi-static scheduled resource with repetitions contains non-repetitive data. In one or more embodiments, WD 22 such as via one or more of processing circuitry 84, processor 86 and radio interface 82 is configured to allocate the periodic or semi-static scheduled resource for a retransmission of failed packets for at least one service. In one or more embodiments, WD 22 such as via one or more of processing circuitry 84, processor 86 and radio interface 82 is configured to use a configured grant, CG, to transmit at least one transmission block, TB, of a service. In one or more embodiments, WD 22 such as via one or more of processing circuitry 84, processor 86 and radio interface 82 is configured to use a single CG configured for a second WD 22 to receive a transmission block, TB, from the network node 16. In one or more embodiments, WD 22 such as via one or more of processing circuitry 84, processor 86 and radio interface 82 is configured to reallocate the periodic or semi-static scheduled resource to at least one new service.

Having described the general process flow of arrangements of the disclosure and having provided examples of hardware and software arrangements for implementing the processes and functions of the disclosure, the sections below provide details and examples of arrangements for utilizing an SPS resource, including the repetition resource, for multiple services. It is noted that references are made below to one or more of WD 22 and/or network node 16 performing certain functions. Functions performed by a network node 16 can be performed by one or more of the elements shown as comprised in network node 16, such as, but not limited to processing circuitry 68, node SPS unit 32, communication interface 60 and/or radio interface 62. Functions performed by a WD 22 can be performed by one or more of the elements shown as comprised in WD 22, such as, but not limited to processing circuitry 84, WD SPS unit 34, and/or radio interface 82.

Embodiments provide for utilizing an SPS resource for multiple services where, as discussed above, the SPS resource can be a period or semi-static scheduled resource. The periodic or semi-static scheduled resource, i.e., the SPS resource, may be associated with at least a single activating DCI, or single SPS identification number (SPS ID #X), or radio resource control (RRC) based activation number of a single SPS ID #X. In accordance with various embodiments, multiple such services may be transmitted over the same SPS (ID #X). In a similar manner, for the case of CGs, a single CG may be associated with an at least single activating DCI or single ID (CG ID #Y) or RRC based activation of CG ID #Y. Multiple services may be transmitted over the same CG (ID #Y). Accordingly, embodiments provide for allocating a periodic or semi-static scheduled resource to a WD 22 for use in communication for at least two services having different reliability and/or transmission characteristics. The at least two services may have different priorities, MCS schemes, Demodulation Reference Signals (DMRS), redundancy version (RV) patterns, reliability, latency budgets, retransmission requirements, bit rates, repetitions, TBS size, associated feedback policies, etc. Below is a description of various embodiments for uplink (UL) SPS, UL CG.

Multiple Services

A Single SPS for Multiple Services

Assume a WD 22 has, e.g., nearly deterministic URLLC packet arrivals, and semi-deterministic or random eMBB packet arrivals. In such a case, the network node 16 can allocate a common SPS resource for plurality of a services. A few example scheduling methodologies in accordance with one or more embodiments are discussed below.

1. A single SPS resource is allocated by estimating the packet arrival from all possible different services for a given WD 22.

2. An SPS is primarily allocated for a URLLC stream, and therefore the periodicity of the SPS resource is kept the same as that of a URLLC packet arrival periodicity. Here, at some time instance, if there is no URLLC data to transmit, then such resource can be utilized for eMBB packet or other traffic.

3. The periodicity of the SPS resource is greater than a URLLC packet arrival periodicity. This provides a few advantages.

a. With this scheduling, WD 22 can counter URLLC packet arrival fluctuation, as SPS resource allocation periodicity is more than the traffic itself.

b. If a WD 22 has more than one traffic type, then other services' packets can utilize the over allocated SPS resource.

Exploiting SPS Repetition Resources for Throughput Gain

Figure 12:
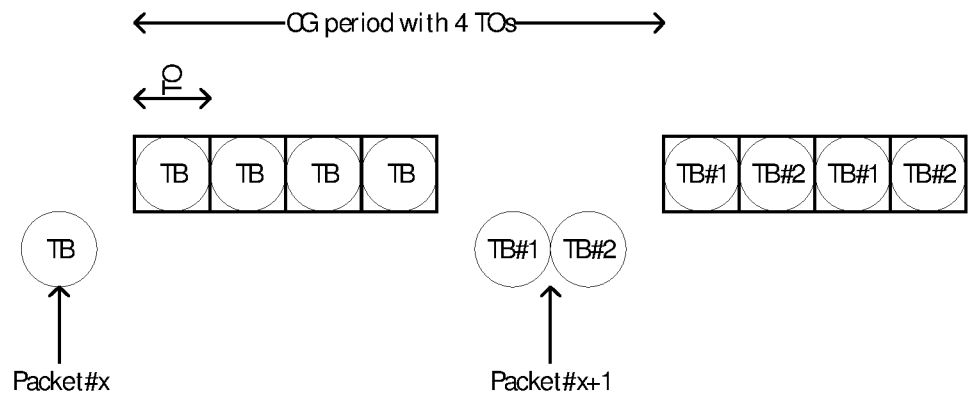
FIG. 12 is an illustration of a WD transmitting different transport blocks in a SPS repetition resource according to some embodiments of the present disclosure.

FIG. 12 is an illustration 140 of a wireless device 22 transmitting different transport blocks (TBs) in a SPS repetition resource according to some embodiments of the present disclosure. A network node 16 may can allocate a SPS resource with repetitions for reliability gain, e.g., CG with K repetitions. An idea behind the scheduling is that if a packet arrives that is unexpectedly too large to be fit into a single repetition resource, the WD 22 may automatically utilize the multiple repetitions resource to transmit a single packet, i.e., dividing a packet into multiple Transport Blocks (TBs) over the repetition resource. An indication may be sent that the transmitted packets are in the different TBs, not the repetitions.

Consider an example of an allocated CG with K=4 repetitions for some URLLC stream. Consider in some time instance, the arriving URLLC packet is larger than can be put into a single repetition resource. For example, WD 22 may utilize repetition resource one and two to transmit this large packet into two TBs, TB #1 and TB #2, and repetition resource three and four to transmit a repetition of TB #1 and TB #2, see FIG. 12. In another example, WD 22 may utilize three or all four repetition resources to transmit a packet divided into multiple TBs.

When there is no URLLC data to transmit on SPS, then other service data, e.g., eMBB data, can be transmitted. In one such scenario, a large eMBB packet can be transmitted, carved into multiple TBs, over repetition resources, in case the WD 22 has no URLLC data to transmit over an instance of a SPS resource.

Splitting SPS Repetition Resources for Transmission of Multiple Services

Figure 13:
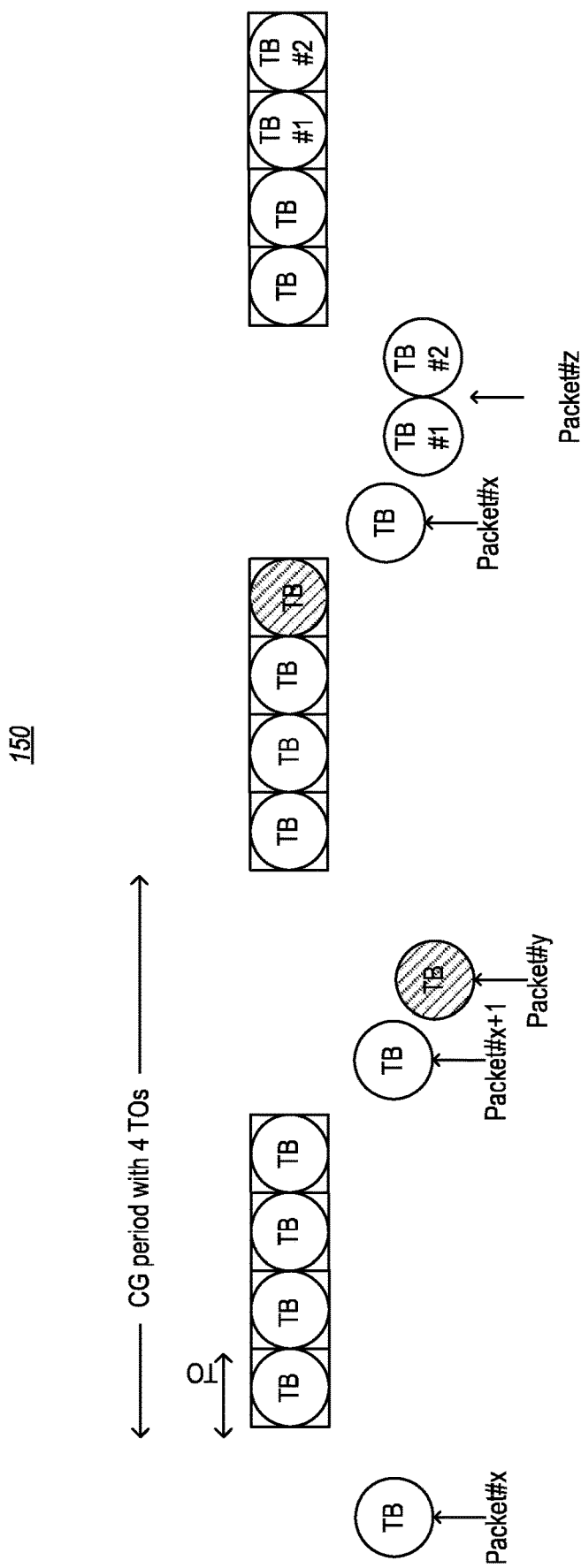
FIG. 13 is an illustration of a WD transmitting multiple services in a SPS repetition resource according to some embodiments of the present disclosure.

FIG. 13 is an illustration 150 of a wireless device 22 transmitting multiple services, i.e., transmitting signals, data, packets, etc., associated with the multiple services, in a SPS repetition resource according to some embodiments of the present disclosure. In this embodiment, a WD 22 can utilize a repetition resource to transmit multiple services, see FIG. 13. Therein, a large service packet has split its packet into multiple TBs over a portion of repetition resources. As shown in FIG. 13, a CG is allocated to service #x. However, on the CG resource, other service packets (#y, #z) can be supported.

Splitting SPS Repetition Resources Proportional to Services Priority

Figure 14:
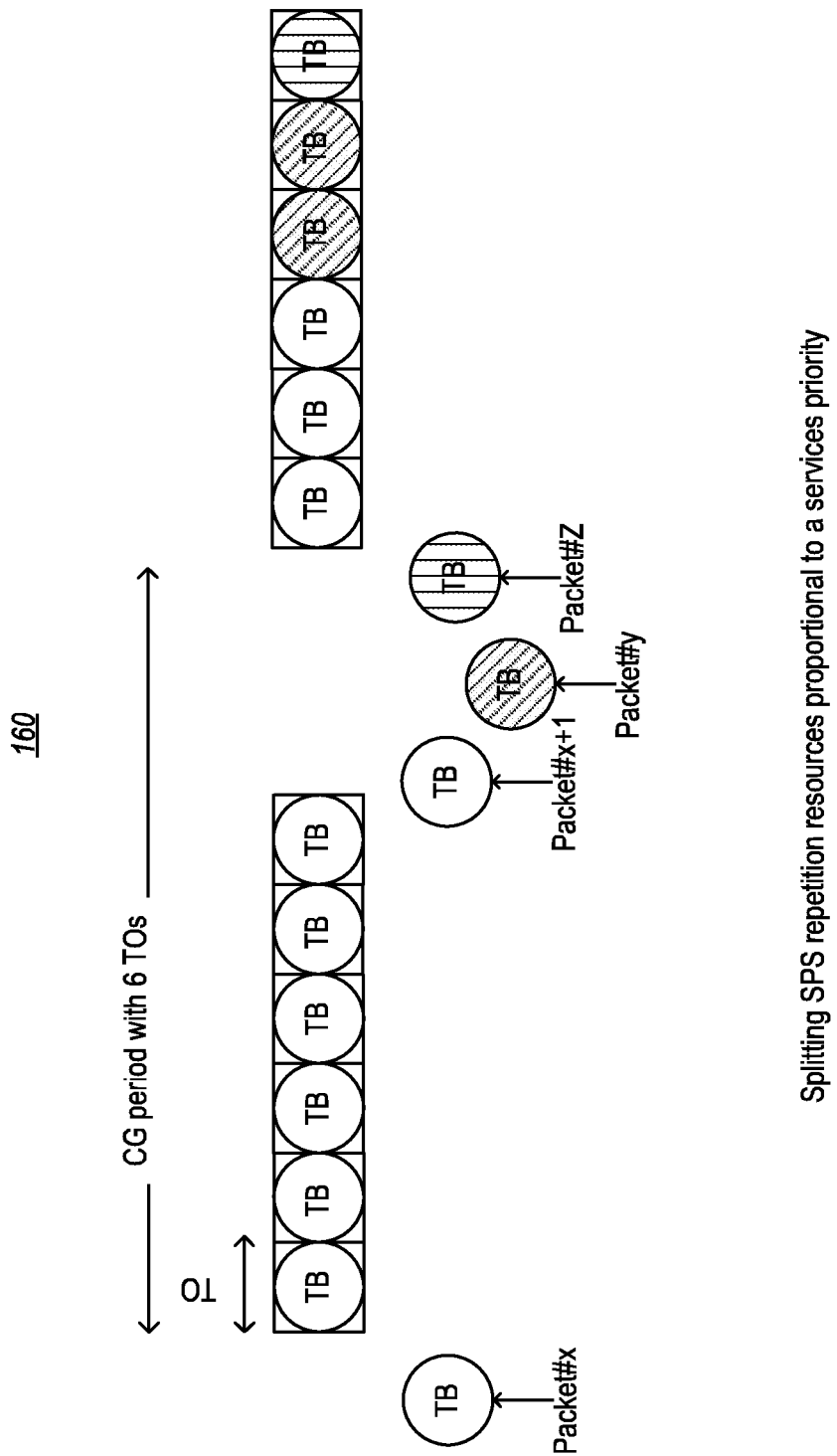
FIG. 14 is an illustration of a WD splitting SPS repetition resources in proportion to a services priority according to some embodiments of the present disclosure.

FIG. 14 is an illustration 160 of a wireless device 22 splitting SPS repetition resources proportional to a services priority according to some embodiments of the present disclosure. Extending the above described embodiments, a WD 22 can split repetition resources to transmit different services' priorities (if the services' packets arrive during the SPS period), e.g., in proportion to the priority (see FIG. 14) or with some other function based on priority, latency etc.

As shown in FIG. 14, A CG is allocated to service #x. However, on the CG resource, other service packets (#y, #z) may be catered such that service #x (high reliability) does more repetitions than moderate reliability service #y, and so service #y transmits more repetitions than low reliability service #z.

Differentiating TBs Over Repetition Resource in Case they are not Repetitions

In some of the above embodiments, the repetitions resource can be exploited to transmit different services or different TBs from the same service. To notify the receiver, e.g., network node 16, that intended transmissions are not repetitions, the receiver must be warned, and therefore one or more of the following methodologies can be adopted.

1. For different services, different Demodulation Reference Signal (DMRS) sequences can be allocated.

a. Different DMRS position can also indicate different service.

2. For a given service, WD 22 can utilize a different DMRS sequence if the successive repetition resources contain the same TB.

a. Different DMRS position may also indicate that the TB on the repetition resource is not a repetition.

3. If the repetitions' redundancy versions (RVs) are configured with self-decodable RVs, e.g., 0 or 3 (approximate), then the service differentiator, TB differentiator (for same service) can be indicated in the TB itself.

Backup SPS Resource for Retransmission Needs from Multiple Services

Figure 15:
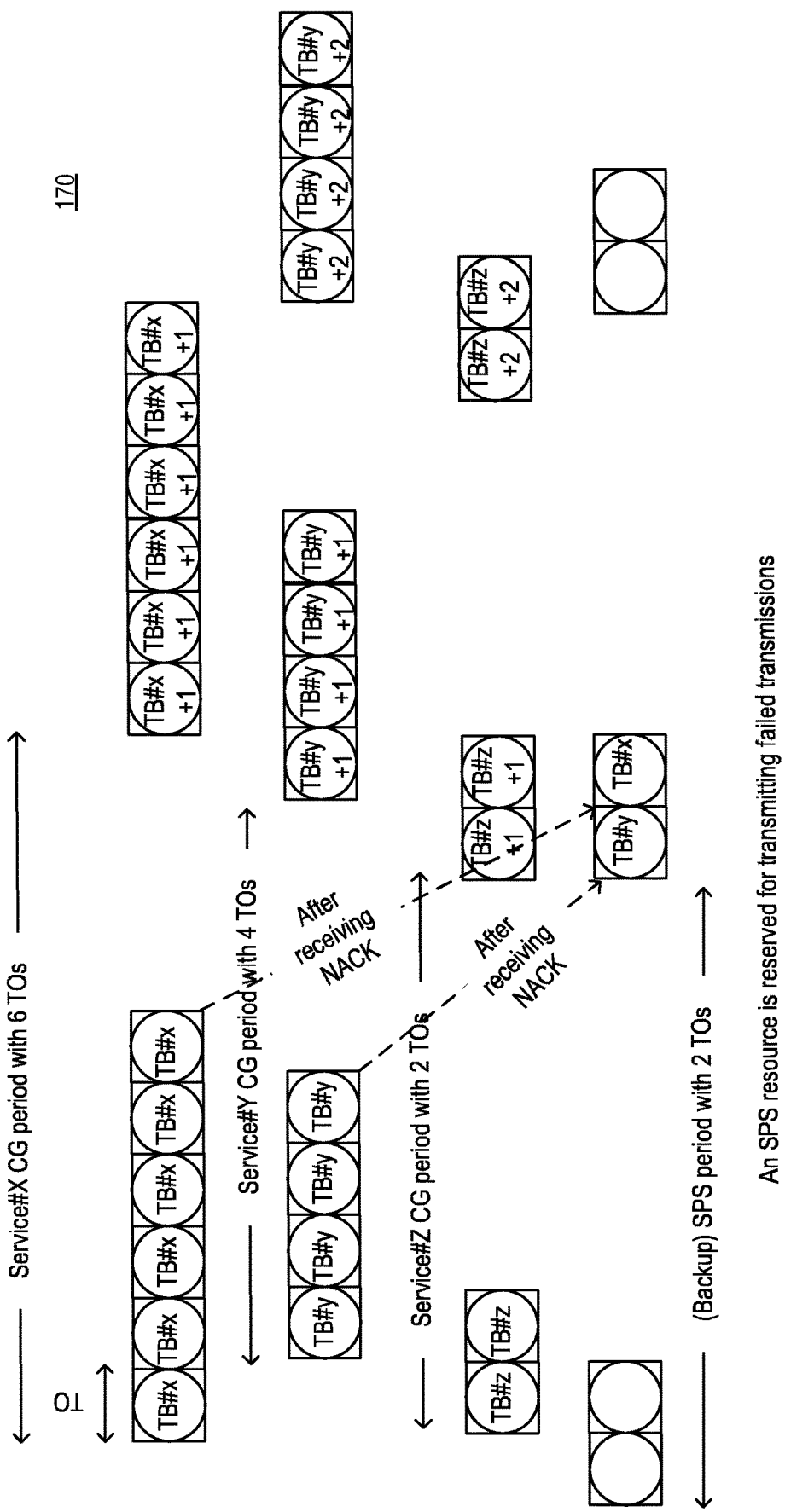
FIG. 15 is an illustration of reserving an SPS resource for transmitting failed transmissions according to some embodiments of the present disclosure.

FIG. 15 is an illustration 170 of reserving an SPS resource for transmitting failed transmissions according to some embodiments of the present disclosure. A WD 22 can be allocated multiple SPS grants for different services. If the services are URLLC based with different reliability and latency budgets, then their retransmission would be required urgently. Given, the WD 22 granted resources for multiple services, an SPS resource can be allocated for the retransmission of failed packets from any service, see FIG. 15. If the resource is limited, and there are multiple packets that need to be transmitted, then the most prioritized packet is transmitted in the backup SPS resource.

Figure 16:
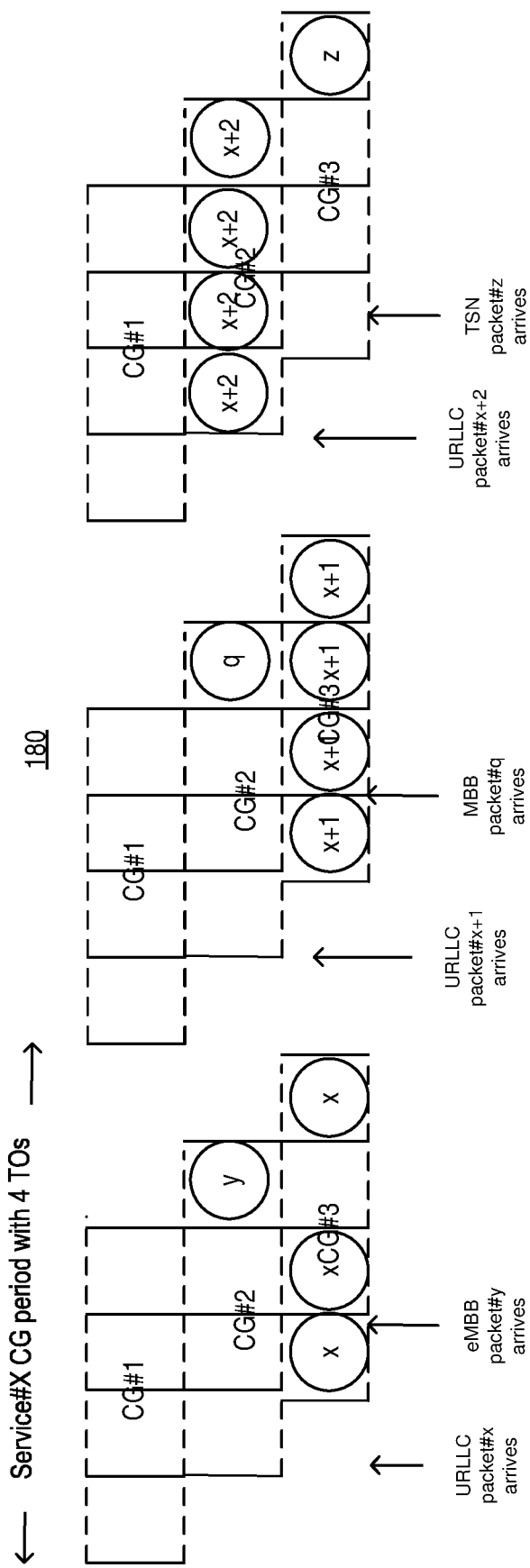
FIG. 16 is an illustration of utilizing a spared SPS resource for other services according to some embodiments of the present disclosure.

Utilizing Spared SPS Resource (of Use Case with Countering Misalignment with Multiple SPS Grants) for Other Services FIG. 16 is an illustration 180 of utilizing a spared SPS resource for other services according to some embodiments of the present disclosure. In UL CG, multiple CGs can be allocated to counter misalignment due to fluctuating traffic. When this traffic arrives, WD 22 can choose one CG out of multiple CGs for transmitting, e.g., K repetitions. However, with this, other CGs remain unutilized. Therefore, the network node 16 can allow a WD 22 to transmit other TBs on the spared resources, and this can be done in at least the following ways.

1. WD 22 can transmit its K repetitions in one of the chosen CGs and also transmit some other service's TB in another CG simultaneously, in the same timeslot, see FIG. 16.

2. WD 22 can transmit K-1 repetitions in some chosen CG, and one repetition over a timeslot during which some other service's TB is transmitted in some other CG, see FIG. 16.

3. WD 22 transmits its K repetitions in one chosen CG. In some other CG, WD 22 can transmit another service's TB before or after transmitting K repetitions, see FIG. 16.

As shown in FIG. 16, Service #x is allocated 4 CGs and each with 4 repetitions to counter misalignment. However, in other CGs, WD 22 can transmit packets belonging to other services.

Utilizing Spared SPS Resource (of Use Case with Countering Misalignment with Multiple SPS Grants) by Other WDs 22 by Employing Channel Sensing Algorithms Extending the above discussed embodiments to multi-WD 22 scenarios, where other WDs 22 (secondary WDs 22) can be allowed to utilize spared CGs allocated to a particular WD 22 (primary WD 22) provided that these CGs are used for countering misalignment. However, secondary WDs 22 can utilize the spared resources belonging to primary WD 22 under some restrictions. One restriction is that secondary WDs 22 must not interfere with primary WD 22's transmission (of K repetition in the CG). Hence, for this, secondary WDs 22 must sense the channel (e.g., using listen-before-talk (LBT)) to know whether the CG is occupied or not. If the CG is occupied, then the secondary WDs 22 must prohibit themselves from transmitting in that particular CG, otherwise it may be allowed to transmit.

Multiple SPS Instances within a Period for Reliability Gain

Figure 17:
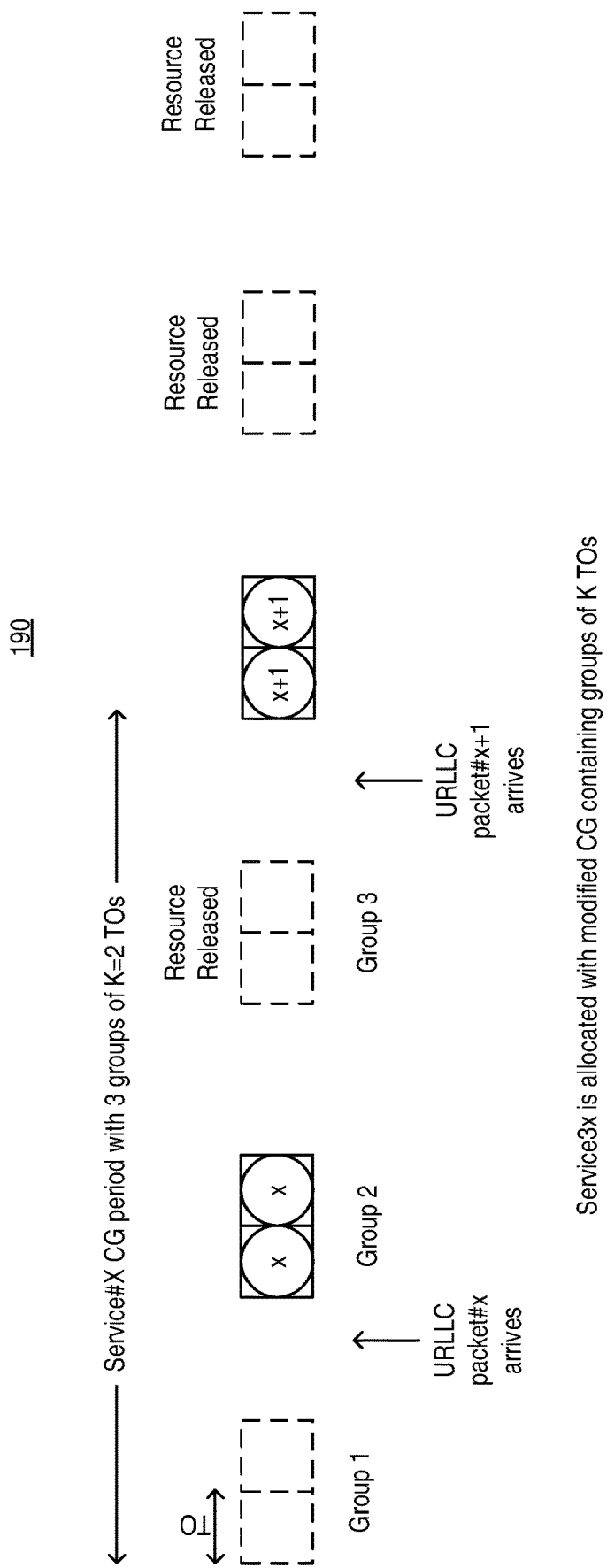
FIG. 17 is an illustration of utilizing multiple SPS instances within a period for reliability gain according to some embodiments of the present disclosure.

FIG. 17 is an illustration 190 of utilizing multiple SPS instances within a period for reliability gain according to some embodiments of the present disclosure. Currently, in CG, a WD 22 may be allocated K Transmission Occasions (TOs) within a period to transmit K repetitions. If the URLLC packet arrival is late, then it may miss some or all of the TOs. To deter such fluctuating behavior, WD 22 can be allocated with multiple groups of a number (K) of TOs. If a WD 22 is late, then it may utilize one group to transmit its K repetitions within a period, see FIG. 17, where three groups of K TOs are allocated with in a period. The groups are separated with a time gap. If the time gap is zero, then the groups are allocated consecutively. As shown in FIG. 17, Service3x may be allocated with a modified CG containing groups of K TOs.

Releasing SPS Instance (Portion) after a Transmission within a Period

In one or more embodiments, if a group is utilized to transmit its repetitions, then the successive groups are automatically released. As shown in FIG. 17, as repetitions are transmitted in second group, the third group will be automatically freed, and the network can utilize the resource for other purposes. For example, node 16 may "reallocate" a periodic or semi-static scheduled resource allocated to a first service to at least one new service.

In another embodiment, WD 22 can be allowed to transmit its other service's data in unutilized groups as shown in FIG. 17.

1. Different services can be differentiated based on, e.g.,
   a. Logical channel mapping,
   b. Physical layer indication (e.g., explicit indicator in downlink control information (DCI)), and/or
   c. Reliability and latency requirements.
2. The same embodiments may be applied for DL SPS.
3. Resource allocation may be slot-based in some of the described embodiments; however, the same embodiments can be applied with allocation resources using mini-slot, sub-slot, orthogonal frequency-division multiplexing (OFDM) symbols, subframes or mix of them.

Some additional embodiments are as follows.

Embodiment A1. A network node configured to communicate with a wireless device (WD), the network node configured to, and/or comprising a radio interface and/or comprising processing circuitry configured to:
  allocate a single semi-persistent scheduling (SPS) resource to the WD for use in transmitting at least two WD services to the WD.

Embodiment A2. The network node of Embodiment A1, wherein the single SPS resource is allocated at least by estimating a packet arrival from each of the at least two WD services.

Embodiment A3. The network node of one of Embodiments A1-A2, wherein the network node, and/or the radio interface and/or the processing circuitry is further configured to set a periodicity of the single SPS resource to a periodicity of an ultra-reliable and low latency communication (URLLC) packet arrival periodicity of a URLLC stream.

Embodiment A4. The network node of any one of Embodiments A1-A3, wherein the network node, and/or the radio interface and/or the processing circuitry is further configured to set a periodicity of the single SPS resource to a periodicity greater than a URLLC packet arrival periodicity.

Embodiment A5. The network node of any one of Embodiments A1-A4, wherein the network node, and/or the radio interface and/or the processing circuitry is further configured to utilize a SPS repetition resource by transmitting a single data packet in multiple Transport Blocks (TBs) over the SPS repetition resource.

Embodiment A6. The network node of Embodiment A5, wherein the network node, and/or the radio interface and/or the processing circuitry is further configured to utilize the SPS repetition resource to transmit multiple services.

Embodiment A7. The network node of any one of Embodiments A5 and A6, wherein the network node, and/or the radio interface and/or the processing circuitry is further configured to utilize the SPS repetition resource in proportion to a services' priority.

Embodiment A8. The network node of any one of Embodiments A5-A7, wherein the network node, and/or the radio interface and/or the processing circuitry is further configured to send the WD an indication that the SPS repetition resource contains non-repetitive data.

Embodiment A9. The network node of any one of Embodiments A1-A8, wherein the network node, and/or the radio interface and/or the processing circuitry is further configured to allocate the SPS resource for a retransmission of failed packets from at least one service.

Embodiment A10. The network node of any one of Embodiments A1-A9, wherein the network node, and/or the radio interface and/or the processing circuitry is further configured to use a configured grant (CG) to transmit at least one TB of a service.

Embodiment A11. The network node of any one of Embodiments A1-A10, wherein the network node, and/or the radio interface and/or the processing circuitry is further configured to use a CG configured for a first WD to transmit a TB to a second WD.

Embodiment A12. The network node of any one of Embodiments A1-A11, wherein the network node, and/or the radio interface and/or the processing circuitry is further configured to reallocate the SPS resource to at least one new service.

Embodiment B1. A method implemented in a network node, the method comprising:
  allocating a single semi-persistent scheduling (SPS) resource to the WD for use in transmitting at least two WD services to the WD.

Embodiment B2. The method of Embodiment B1, wherein the single SPS resource is allocated at least by estimating a packet arrival from each of the at least two WD services.

Embodiment B3. The method of any one of Embodiments B1 and B2, further comprising setting a periodicity of the single SPS resource to a periodicity of an ultra-reliable and low latency communication (URLLC) packet arrival periodicity of a URLLC stream.

Embodiment B4. The method of any one of Embodiments B1-B3, further comprising setting a periodicity of the single SPS resource to a periodicity greater than a URLLC packet arrival periodicity.

Embodiment B5. The method of any one of Embodiments B1-B4, further comprising utilizing a SPS repetition resource by transmitting a single data packet in multiple Transport Blocks (TBs) over the SPS repetition resource.

Embodiment B6. The method of Embodiment B5, further comprising utilizing the SPS repetition resource to transmit multiple services.

Embodiment B7. The method of any one of Embodiments B5 and B6, further comprising utilizing the SPS repetition resource in proportion to a services' priority.

Embodiment B8. The method of any one of Embodiments B5-B7, further comprising sending the WD an indication that the SPS repetition resource contains non-repetitive data.

Embodiment B9. The method of any one of Embodiments B1-B8, further comprising allocating the SPS resource for a retransmission of failed packets from at least one service.

Embodiment B10. The method of any one of Embodiments B1-B9, further comprising using a configured grant (CG) to transmit at least one TB of a service.

Embodiment B11. The method of any one of Embodiments B1-B10, further comprising using a CG configured for a first WD to transmit a TB to a second WD.

Embodiment B12. The method of any one of Embodiments B1-B11, further comprising reallocating the SPS resource to at least one new service.

Embodiment C1. A wireless device (WD) configured to communicate with a network node, the WD configured to, and/or comprising a radio interface and/or processing circuitry configured to:
  receive data from the network node for at least two WD services from a single semi-persistent scheduling (SPS) resource.

Embodiment C2. The WD of Embodiment C1, wherein the single SPS resource is allocated at least by estimating a packet arrival from each of the at least two WD services.

Embodiment C3. The WD of one of Embodiment C1 and C2, wherein the WD, and/or the radio interface and/or the processing circuitry is further configured to set a periodicity of the single SPS resource to a periodicity of an ultra-reliable and low latency communication (URLLC) packet arrival periodicity of a URLLC stream.

Embodiment C4. The WD of any one of Embodiments C1-C3, wherein the WD, and/or the radio interface and/or the processing circuitry is further configured to set a periodicity of the single SPS resource to a periodicity greater than a URLLC packet arrival periodicity.

Embodiment C5. The WD of any one of Embodiments C1-C4, wherein the WD, and/or the radio interface and/or the processing circuitry is further configured to utilize a SPS repetition resource to receive a single data packet from the network node in multiple Transport Blocks (TBs) over the SPS repetition resource Embodiment C6. The WD of Embodiment C5, wherein the WD, and/or the radio interface and/or the processing circuitry is further configured to utilize the SPS repetition resource for multiple services.

Embodiment C7. The WD of any one of Embodiments C5 and C6, wherein the WD, and/or the radio interface and/or the processing circuitry is further configured to utilize the SPS repetition resource in proportion to a services' priority.

Embodiment C8. The WD of any one of Embodiments C5-C7, wherein the WD, and/or the radio interface and/or the processing circuitry is further configured to receive from the network node an indication that the SPS repetition resource contains non-repetitive data.

Embodiment C9. The WD of any one of Embodiments C1-C8, wherein the WD, and/or the radio interface and/or the processing circuitry is further configured to allocate the SPS resource for a retransmission of failed packets from at least one service.

Embodiment C10. The WD of any one of Embodiments C1-C9, wherein the WD, and/or the radio interface and/or the processing circuitry is further configured to use a configured grant (CG) to transmit at least one TB of a service.

Embodiment C11. The WD of any one of Embodiments C1-C10, wherein the WD, and/or the radio interface and/or the processing circuitry is further configured to use a CG configured for a second WD to receive a TB from the network node.

Embodiment C12. The WD of any one of Embodiments C1-C11, wherein the WD, and/or the radio interface and/or the processing circuitry is further configured to reallocate the SPS resource to at least one new service.

Embodiment D1. A method implemented in a wireless device (WD), the method comprising:
receive data from a network node for at least two WD services from a single semi-persistent scheduling (SPS) resource.

Embodiment D2. The method of Embodiment D1, wherein the single SPS resource is allocated at least by estimating a packet arrival from each of the at least two WD services.

Embodiment D3. The method of one of Embodiments D1-D2, further comprising setting a periodicity of the single SPS resource to a periodicity of an ultra-reliable and low latency communication (URLLC) packet arrival periodicity of a URLLC stream.

Embodiment D4. The method of any one of Embodiments D1-D3, further comprising setting a periodicity of the single SPS resource to a periodicity greater than a URLLC packet arrival periodicity.

Embodiment D5. The method of any one of Embodiments D1-D4, further comprising utilizing a SPS repetition resource to receive a single data packet from the network node in multiple Transport Blocks (TBs) over the SPS repetition resource Embodiment D6. The method of Embodiment D5, further comprising utilizing the SPS repetition resource for multiple services.

Embodiment D7. The method of any one of Embodiments D5 and D6, further comprising utilizing the SPS repetition resource in proportion to a services' priority.

Embodiment D8. The method of any one of Embodiments D5-D7, further comprising receiving from the network node an indication that the SPS repetition resource contains non-repetitive data.

Embodiment D9. The method of any one of Embodiments D1-D8, further comprising allocating the SPS resource for a retransmission of failed packets from at least one service.

Embodiment D10. The method of any one of Embodiments D1-D9, further comprising using a configured grant (CG) to transmit at least one TB of a service.

Embodiment D11. The method of any one of Embodiments D1-D10, further comprising using a CG configured for a second WD to receive a TB from the network node.

Embodiment D12. The method of any one of Embodiments D1-D11, further comprising reallocating the SPS resource to at least one new service.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| CG | Configured Grant |
| DL | Downlink |
| DMRS | Demodulation Reference Signal |
| eMBB | enhanced Mobile Broadband |
| LBT | Listen Before Talk |
| LTE | Long Term Evolution |
| NR | Next Radio |
| SPS | Semi-Persistent Scheduling |
| TB | Transport Block |
| UE | User Equipment |
| UL | Uplink |
| URLLC | Ultra-Reliable Low Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, WD, the network node comprising processing circuitry configured to:
   set a periodicity of one of a periodic and semi-static scheduled resource to a periodicity of an ultra-reliable and low latency communication, URLLC, packet arrival periodicity of a URLLC stream, and if there is no URLLC data arrival, using a periodicity of the one of the periodic and the semi-static scheduled resource for enhanced mobile broadband, eMBB, packet arrival; and
   allocate the one of the periodic and a semi-static scheduled resource to the WD for use in communication for at least two services, the services having one of at least different reliability and different transmission characteristics.

2. The network node of claim 1, wherein the one of periodic and semi-static scheduled resource is at least one semi-persistent scheduling, SPS, resource for use in downlink, DL, communication for the at least two services.

3. A method implemented in a network node, the method comprising:
   setting a periodicity of one of a periodic and semi-static scheduled resource to a periodicity of an ultra-reliable and low latency communication, URLLC, packet arrival periodicity of a URLLC stream, and if there is no URLLC data arrival, using a periodicity of the one of the periodic and the semi-static scheduled resource for enhanced mobile broadband, eMBB, packet arrival; and
   allocating the one of the periodic and semi-static scheduled resource to the WD for use in communication for at least two services, the services having one of at least different reliability and different transmission characteristics.

4. The method of claim 3, wherein the one of the periodic and semi-static scheduled resource is at least one semi-persistent scheduling, SPS, resource for use in downlink, DL, communication for the at least two services.

5. The method of claim 3, wherein the one of the periodic and semi-static scheduled resource is at least one configured grant, CG, resource for use in uplink, UL, communication for the at least two services.

6. The method of claim 3, wherein the one of the periodic and semi-static scheduled resource is allocated at least by estimating a packet arrival from each of the at least two services.

7. The method of claim 3, further comprising setting the periodicity of the one of the periodic and the semi-static scheduled resource to a periodicity greater than the URLLC packet arrival periodicity.

8. The method of claim 3, further comprising utilizing the one of the periodic and the semi-static scheduled resource with repetitions by transmitting a data packet separated across multiple Transport Blocks, TBs, over the periodic or the semi-static scheduled resource with repetitions.

9. The method of claim 8, further comprising utilizing the one of the periodic and semi-static scheduled resource with repetitions in proportion to at least one of a priority and a reliability of a service.

10. The method of claim 8, further comprising sending the WD an indication that the one of the periodic and semi-static scheduled resource with repetitions contains non-repetitive data.

11. The method of claim 8, further comprising configuring the WD use a single CG configured for a first WD to transmit a transmission block, TB, to a second WD.

12. A wireless device, WD, configured to communicate with a network node, the WD comprising processing circuitry configured to:
   receive data from the network node for at least two services in one of a periodic and semi-static scheduled resource allocated to the WD, the services having one of at least different reliability and different transmission characteristics, a periodicity of the one of the periodic and the semi-static scheduled resource being set to a periodicity of an ultra-reliable and low latency communication, URLLC, packet arrival periodicity of a URLLC stream, and if there is no URLLC data arrival, using a periodicity of the one of the periodic and the semi-static scheduled resource for enhanced mobile broadband, eMBB, packet arrival.

13. The WD of claim 12, wherein the one of the periodic and semi-static scheduled resource is at least one semi-persistent scheduling, SPS, resource for use in downlink, DL, communication for the at least two services.

14. A method implemented in a wireless device, WD, the method comprising:
   receiving data from a network node for at least two services in one of a periodic and semi-static scheduled resource allocated to the WD, the services having one of at least different reliability and different transmission characteristics, a periodicity of the one of the periodic and the semi-static scheduled resource being set to a periodicity of an ultra-reliable and low latency communication, URLLC, packet arrival periodicity of a URLLC stream, and if there is no URLLC data arrival, using a periodicity of the one of the periodic and the semi-static scheduled resource for enhanced mobile broadband, eMBB, packet arrival.

15. The method of claim 14, wherein the periodic or semi-static scheduled resource is at least one semi-persistent scheduling, SPS, resource for use in downlink, DL, communication for the at least two services.

16. The method of claim 14, wherein the one of the periodic and semi-static scheduled resource is at least one configured grant, CG, resource for use in uplink, UL, communication for the at least two services.

17. The method of claim 14, further comprising setting the periodicity of the one of the periodic and the semi-static scheduled resource to a periodicity greater than the URLLC packet arrival periodicity.

18. The method of claim 14, further comprising using a single CG configured for a second WD to receive a transmission block, TB, from the network node.

* * * * *